Figure 5:
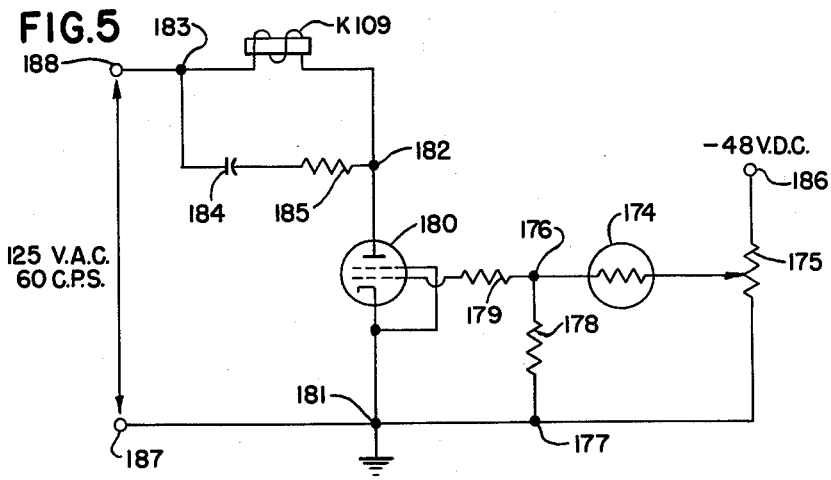

April 24, 1962 H. GROSNICKLE, JR., ETAL 3,031,188
RECORD MEMBER FEED CONTROL MEANS
Filed July 18, 1960 3 Sheets-Sheet 1
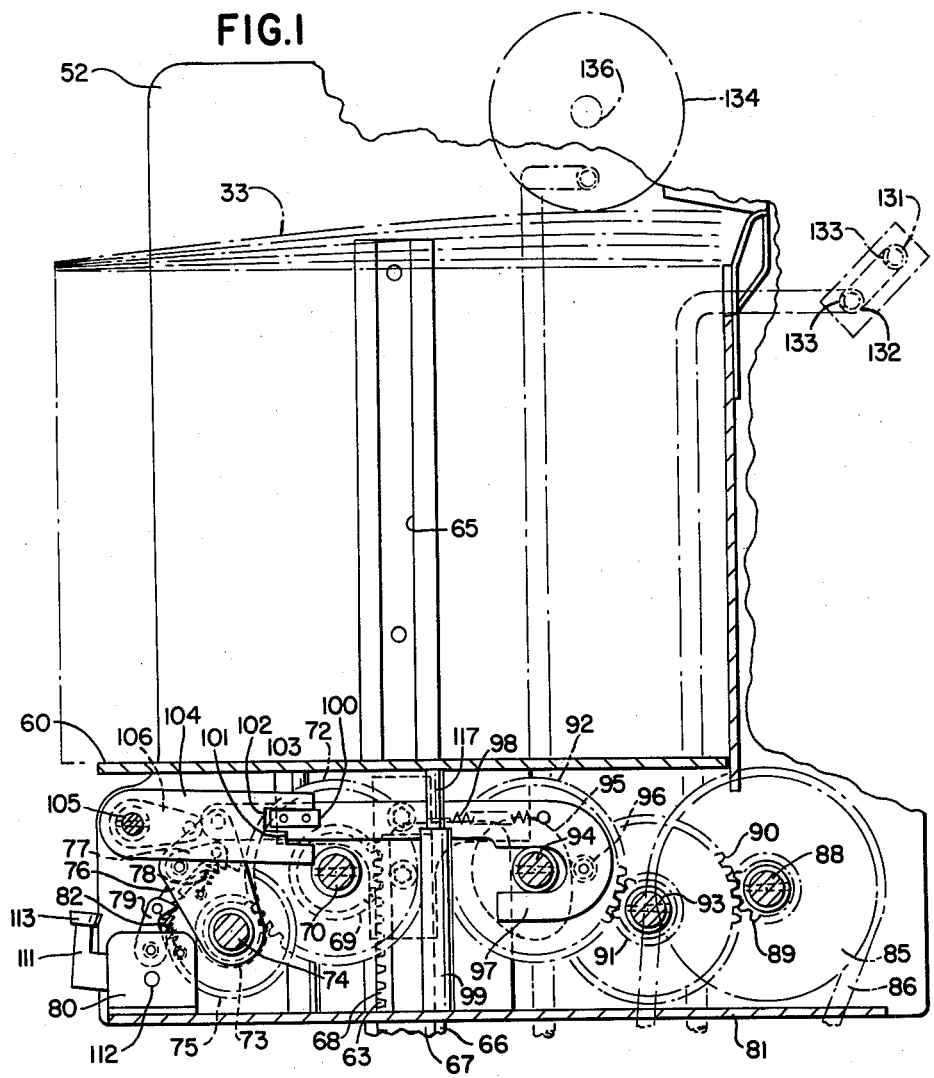
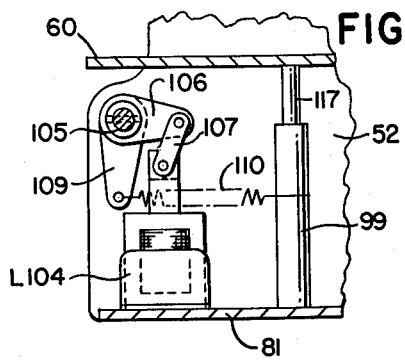
INVENTORS
HENRY GROSNICKLE JR.
WILLIAM C. ARNOLD
BY Louis A. Kline
Albert L. Sessler, Jr.
THEIR ATTORNEYS April 24, 1962  H. GROSNICKLE, JR., ET AL  3,031,188
RECORD MEMBER FEED CONTROL MEANS
Filed July 18, 1960  3 Sheets-Sheet 2
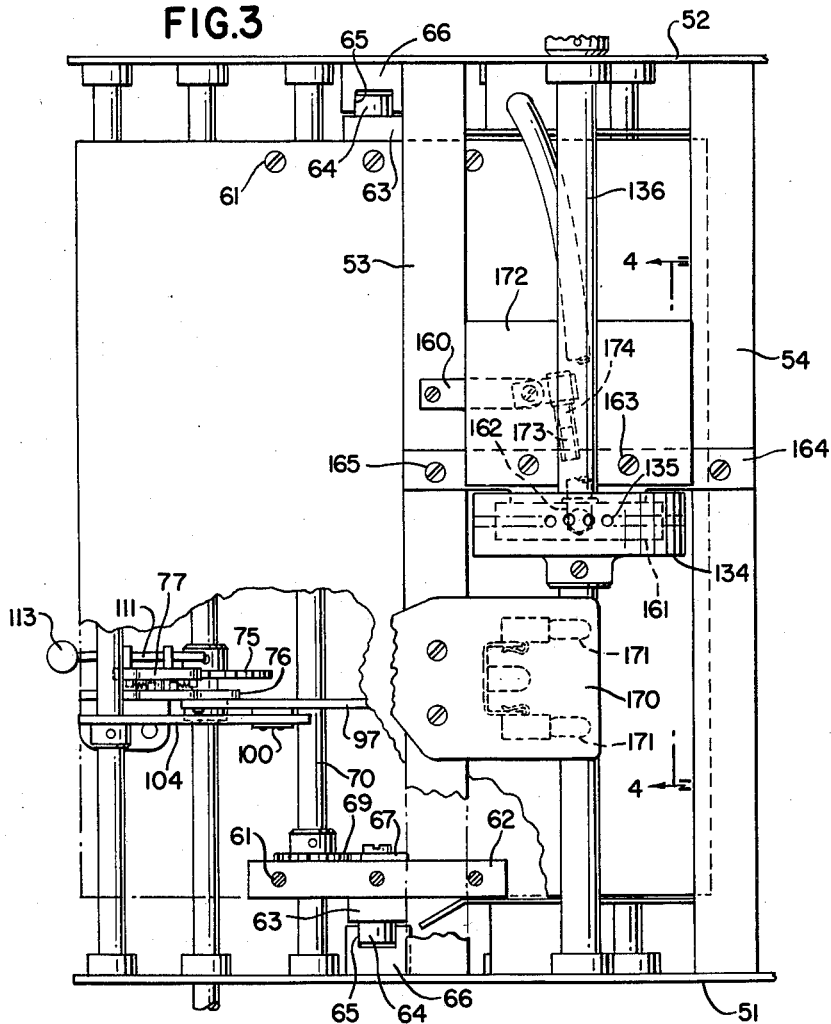
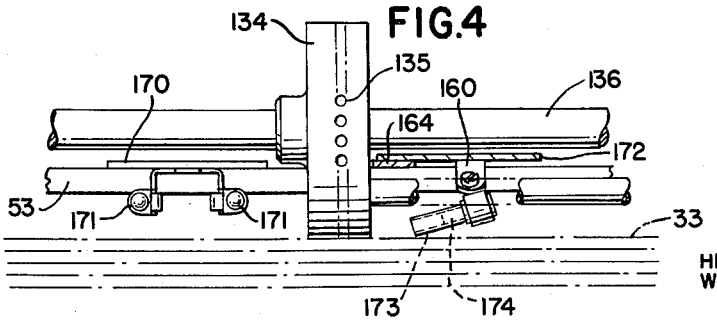
INVENTORS
HENRY GROSNICKLE JR.
WILLIAM C. ARNOLD
BY Louis A. Kline
Albert L. Sessler, Jr.
THEIR ATTORNEYS United States Patent Office 3,031,188
Patented Apr. 24, 1962

3,031,188
RECORD MEMBER FEED CONTROL MEANS
Henry Grosnickle, Jr., and William C. Arnold, Dayton, Ohio, assignors to the National Cash Register Company, Dayton, Ohio, a corporation of Maryland
Filed July 18, 1960, Ser. No. 43,495
6 Claims. (Cl. 271—62)

This invention relates to a record member feeding device, and more particularly relates to means for controlling the elevation of record members stacked in such a feeding device to bring the topmost record member of the stack into operative relation to the mechanism for initiating the actual feeding operation.

The present invention is particularly adapted for use with a record member feeding device of the type disclosed in the co-pending United States patent application Serial No. 770,673, filed on October 30, 1958, inventors Henry Grosnickle, Jr., and William C. Arnold, but is not limited to use with such a device.

Reference to the above-cited application will disclose that a mechanical sensing device is used for controlling the extent of elevating movement of the table which maintains the topmost record member of those stacked on the table in operative relationship to the driving cylinders disclosed therein. While this mechanical sensing device provides the necessary control for maintaining the topmost record member in the desired relationship to the driving cylinders, a simpler and more precise sensing device has been shown to be desirable.

The present invention provides such a device. Due to the novel construction of this sensing device, which employs a radiation source and a radiation-sensitive element, it is possible to govern precisely the position of the topmost record member of a stack without any physical contact between said record member and the sensing means. This is accomplished by utilizing the topmost record member as a reflecting surface for reflecting radiation from the source past a record member driving cylinder to impinge on the radiation-sensitive element for control of an electrical circuit which is in turn effective to control the movement of the table. Furthermore, the position determined is that of the record member at a point adjacent to the driving cylinder, rather than at a point spaced considerably from the driving cylinder, as was the case with the sensing means disclosed in the previously-cited application, Serial No. 770,673. It was necessary to position that sensing means at a point distant from the area of engagement of the card with the driving cylinders due to the fact that any physical pressure exerted upon the card for sensing purposes in the area of the driving cylinders would have adverse effect upon the floating action which was applied to the card by an air stream as part of the means for initiating feeding of the card into a utilizing device, and upon the adhering of the card to the driving cylinders due to suction applied through apertures in the cylinders. Furthermore, the sensing device of the present invention has proven to be more precise and reliable, and easier to adjust, than the mechanical sensing device formerly employed.

It is accordingly an object of the present invention to provide a simple, precise, and effective sensing device for regulating the extent of movement of a table carrying a stack of record members for engagement of said record members, one at a time, with a feeding means.

A further object is to provide a sensing device capable of sensing the position of a record member without physical contact with said record member, and capable of exerting control over means for determining the position of said record member.

An additional object is to provide a sensing device, employing radiation-sensitive means, which is capable of sensing the position of an element, and exerting control over a device for moving said element in a specified manner.

With these and other objects, which will become apparent from the following description, in view, the invention includes certain novel features of construction and combinations of parts, a preferred form or embodiment of which is hereinafter described with reference to the drawings which accompany and form a part of this specification.

Figure 6:
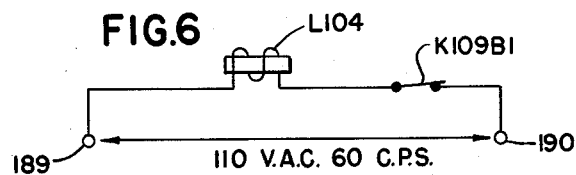

Of said drawings:
FIG. 1 is a sectional side view of a portion of the record member feeding device.
FIG. 2 is a fragmentary detail view of the solenoid for controlling movement of the table drive means shown in FIG. 1.
FIG. 3 is a top view of the record member feeding device, showing placement of the radiation source and the radiation-sensitive means.
FIG. 4 is a partial sectional view of the feeding device, taken along line 4—4 of FIG. 3, and particularly showing the radiation source and the radiation-sensitive means.
FIG. 5 is a circuit diagram showing the operating circuit for the relay which controls energization of the table feed solenoid.
FIG. 6 is a circuit diagram showing the operating circuit for the table feed solenoid.

Referring now to the drawings, a table 60 (FIGS. 1, 2, and 3) is provided in a record member feeding device for holding a stack of ledger cards 33, and for moving the stack upwardly as cards are fed by the feeding means, so that the top card of the stack is always in proper position to be fed. The table 60 is positioned between the side frames 51 and 52 and is supported by the means which control its vertical movement. Fixed to the under side of the table at either side by screws 61 are blocks 62. Fixed to the outer side of each block 62 is a leg 63 carrying rollers 64 arranged to ride in the track 65 of a vertical rail 66. The rails 66 are secured to the side frames 51 and 52. Fastened to the inner side of each block 62 is a rack 67 having thereon teeth 68 arranged to mesh with the teeth of a driving gear 69 fixed to a shaft 70 journaled in the side frames 51 and 52. Spacer blocks (not shown) are secured between respective racks and legs to maintain said racks and legs in proper position.

Also fixed to the same shaft 70 on which the two driving gears 69 are secured is a gear 72, which meshes with a pinion 73 fixed to a shaft 74 journaled in the side frames 51 and 52. Also fixed on the shaft 74 is a ratchet wheel 75, and free on the shaft 74 adjacent to the ratchet wheel is a ratchet plate 76 having pivoted thereon a feed pawl 77, which is urged into engagement with the teeth on the ratchet wheel 75 (FIGS. 4 and 7) by a spring 78. A retaining pawl 79, pivoted on a bracket 80 secured to a base member 81 extending between the side frames 51 and 52, is urged into engagement with the teeth of the ratchet wheel 75 by a spring 82.

Two separate means are provided for driving the table in a vertical direction. The first of these means consists of a crank (not shown), which is secured to a portion of the shaft 74 which extends through the side frame 51 and to the exterior of the housing of the record member feeding device. This permits manual movement of the table 60 in a manner which will subsequently be described.

The second operating means for the table 60 utilizes power from a constantly-operating motor (not shown). A pulley 85 (FIG. 1) is operatively connected by a belt 86 to a smaller pulley (not shown) fixed on the shaft of the motor (not shown). The pulley 85 is fixed on a shaft 88, which is journaled in the side frames 51 and 52. A gear 89, also fixed on the shaft 88, operates through a series of reduction gears 90, 91, and 92, the gears 90 and 91 being fixed on a shaft 93 journaled in the side frames 51 and 52, and the gear 92 being secured on a shaft 94 journaled in the side frames 51 and 52, to drive the shaft 94 and a cam 95 fixed thereon.

The cam 95 is arranged to cooperate with a roller 96 mounted on a pitman 97, which is slotted at one end to ride on the shaft 94 and is pivoted at its other end to the ratchet plate 76. The pitman 97 is normally urged to the left, as viewed in FIG. 1, by a spring 98 secured to said pitman and to one of two posts 99 fixed to the base member 81.

Secured to the pitman 97 near the end of said pitman which is pivoted to the ratchet plate 76 is a stop 100, which is arranged to cooperate with two shoulders 101 and 102 of a slot 103 formed in the end of an arm 104 secured to a shaft 105. The shaft 105 is journaled in the side frames 51 and 52 and has also secured thereto an arm 106 (FIGS. 1 and 2). The arm 106 is connected by means of a link 107 to the actuator of a solenoid L104 secured to the base member 81. Also secured to the shaft 105 is an arm 109, having its free end secured to a spring 110, the other end of which is fixed to one of the posts 99.

An electrical circuit is provided to energize the solenoid L104 when the stack of cards is moved up past a certain elevation by said table, for control of the movement of the table, as will be described subsequently.

Means are provided for shifting the feed pawl 77 and the retaining pawl 79 out of operative engagement with the ratchet wheel 75 to permit the table 60 to be returned in a downward direcion. This means comprises a lever 111 (FIGS. 1 and 3) pivoted by means of a stud 112 on the bracket 80. The lever 111 is provided at one end with a key tip 113 to enable said lever 111 to be manually operated.

For details of the structure by which the lever 111 is operative to effect downward movement of the table 60, reference may be had to the previously-mentioned United States patent application, Serial No. 770,673.

A pair of studs 117, projecting from the upper ends of the posts 99 (FIGS. 1 and 2), function as stops to limit the downward movement of the table 60.

In order to feed the cards from the stack on the table 60, they must first be separated, and the topmost card 33 must be brought into actual engagement with the feeding means. This is accomplished by means of air pressure directed at the top few cards of the stack from two perforated tubes 131 and 132 (FIG. 1) extending transversely from the side frames 51 and 52 and having perforations 133 therein located so as to direct a stream of air toward the leading edges of the stacked cards 33. The tubes 131 and 132 are connected to an air pump (not shown), which is constantly driven by the previously-mentioned motor (not shown). A constant stream of air is thus directed from the perforations 133 in the tubes 131 and 132 toward the stacked cards 33 for fluttering and separating these cards. This stream of air is also effective to shift the topmost few cards of the stack to the dotted-line position indicated in FIG. 1 by the reference character 33, causing said cards, in effect, to float upon the air stream, so that the topmost card is in contact with the periphery of the perforated driving cylinder 134 (FIGS. 1, 3, and 4), which is provided with a plurality of apertures 135 along its peripheries. The cylinder 134 is fixed to a shaft 136, which is journaled in the side frames 51 and 52. The cylinder 134 and the shaft 136 are driven, by means disclosed in the previously-mentioned United States patent application, Serial No. 770,673, to feed the cards 33 from the stack on the table 60 through the feeder.

As has previously been stated, the topmost card 33 of the card stack on the table 60 is blown into contact with the lower portion of the periphery of the cylinder 134 by the air stream from the perforations 133 in the tubes 131 and 132. This card is retained in engagement with the periphery of the cylinder 134 by a vacuum applied to the card through the apertures 135 in the cylinder 134 and transmitted to the interior of the cylinder 134 from a vacuum pump (not shown), driven by the previously-described motor. From the vacuum pump, the vacuum is transmitted via a control valve and a plurality of tubes to a block 161 positioned in the hollow interior of the cylinder 134. The manner in which the control valve functions in response to the control circuitry of the card feeder is fully disclosed in the previously-mentioned United States patent application, Serial No. 770,673. A passage 162 in the block 161 receives one end of a vacuum tube and provides a path to the apertures 135, which extend through the cylinder 134 to the hollow interior thereof. The block 161 is secured to a supporting plate 164, which in turn is secured by bolts 165 to bars 53 and 54.

The manner in which the components of the novel sensing means of the present invention are mounted with respect to the cylinder 134 is shown in FIGS. 3 and 4. Fixed to a bracket 170, which in turn is secured to the bar 53, and located to one side of the cylinder 134, is a light source which may consist of two illuminating tubes 171. On the other side of the cylinder 134, and secured to the supporting plate 164 by bolts 163, is a shield 172, which acts to prevent stray illumination from falling on the ledger card 33 or the cylinder 134 below and to the side of said shield. Secured to the bar 53, and positioned below the shield 172 by a bracket 160, is a tube 173, having at its inner end a photocell 174. It will be noted that the photocell is so positioned within the tube that any light which reaches it must be directed rather precisely.

I will be clear from an examination of FIG. 4 that the light from the tubes 171 will, when the topmost card 33 is positioned slightly below the cylinder 134, be reflected from the surface of said card and into the tube 173 to illuminate the photocell 174. It has been found through experiment that this reflection will occur when the card 33 is more than approximately one eighth of an inch from the cylinder 134. The maximum distance which the card 33 may be from the cylinder 134 varies according to the characteristics of the photocell 174 and the component values of the circuit in which it is employed, but the topmost card 33 is normally effective to act as a suitable reflector to reflect the light from the tubes 171 into the photocell 174 when the card is approximately half-way between the uppermost position of the table and the lowermost position of the table, or higher.

The photocell 174 may be of any suitable type, such as type CL-3, manufactured by the Clairex Corporation, and is incorporated in a relay-operating circuit, such as that shown in FIG. 5. As shown therein, the photocell 174 is connected between a tap on a potentiometer 175 and a point 176. The potentiometer 175 is connected at one end to a terminal 186, to which may be applied a source of −48 volts D.C. power, and is connected at its other end to a point 177. The potentiometer tap may be adjusted to vary the potential applied to the photocell 174. The points 176 and 177 are connected over a 470,000-ohm resistor 178.

The point 176 is also connected over a 100,000-ohm current-limiting resistor 179 to the No. 1 control electrode of a thyratron 180, which may be of type 5696. The cathode of the thyratron 180 and the No. 2 control electrode thereof are connected together and to a base reference potential shown herein as ground, to which the point 177 is also connected, at a point 181.

The anode of the thyratron 180 is connected to a point 182. Between the point 182 and a point 183 is a relay K109 in parallel with a series combination of a 2-microfarad capacitor 184 and a 1,000-ohm resistor 185, which function to smooth out the ripple in the current applied to the relay K109 to prevent its chattering. The points 181 and 183 are connected to terminals 187 and 188, to which may be applied a source of 125 volts A.C. 60 c.p.s. power.

As shown in FIG. 6, contacts K109B1, controlled by the relay K109, and closed when said relay is in deenergized condition, are placed in series with the table feed solenoid L104, between two terminals 189 and 190, to which is applied a source of 110 volts A.C. 60 c.p.s. power. It will be seen that the table feed solenoid L104 is energized so long as the relay K109 is deenergized. The manner in which the circuits of FIGS. 5 and 6 function to control the table feed mechanism of the present invention will be described subsequently.

The operation of the table 60 to supply ledger cards 33 to the feeding mechanism of the card feeder of the present invention will now be described. As has been stated, the table 60 may be operated in either one of two ways, manually, by use of the crank, or automatically, by the constantly operating motor, as controlled by the novel sensing means, for limiting of the upward movement of the table 60 in accordance with the size of the stack of cards 33 positioned thereon.

When operation of the card feeder commences, it is often desirable to adjust the position of the table 60 manually by use of the crank, since this may be accomplished more quickly than if the machine were caused to position the table automatically. This may be accomplished simply by turning the crank the desired extent, so that the table 60 is located in the proper position. The movement of the crank is transmitted through the shaft 74, the pinion 73, the gear 72, and the shaft 70 to the two gears 69, which are arranged in coacting relationship with the two racks 67 secured to the table 60, through the blocks 62. During this movement, the retaining pawl 79, pivoted on the bracket 80, and the feed pawl 77, pivoted on the plate 76, merely ratchet over the teeth of the ratchet wheel 75 on the shaft 74 and do not impede the rotation of said shaft. Once the crank has been turned to the desired extent, the shaft 74, and therefore the shaft 70 and the table 60, are retained in proper position by the coaction of the retaining pawl 79 with the teeth on the ratchet wheel 75, since the pawl 79 is of the well-known "one way" type, permitting the ratchet wheel 75 to rotate clockwise, as seen in FIG. 1, but preventing counter-clockwise rotation of the ratchet wheel 75.

In the automatic operation of the table 60, power is transmitted from the motor through its associated pulley, the belt 86, the pulley 85, and the gear train 89, 90, 91, and 92 to the cam 95 (FIG. 1). This cam, by engagement with the roller 96 on the pitman 97, imparts regularly-excursioned movement to said pitman and to the plate 76, to which the pitman is pivoted at one end. The feed pawl 77, which is pivoted to the plate 76 and urged into engagement with the ratchet wheel 75 by the spring 78, causes the ratchet wheel 75 to be fed one step in a clockwise direction for each of the regularly-excursioned movements of the pitman 97, while the retaining pawl 79 acts to prevent backward slippage of the wheel 75 during the return movement of the pawl 77 in each complete movement of the pitman 97.

Movement of the ratchet wheel 75 in a clockwise direction by the pawl 77 is transmitted through the shaft 74, the pinion 73, the gear 72, and the shaft 70 to the two gears 69 cooperating with the racks 67 secured to the table 60 through the blocks 62, and the table 60 is thereby caused to move in an upward direction.

The photocell 174 acts to limit the upward movement of the table 60, so that the top card 33 of the stack of ledger cards thereon will always be in proper position to be carried by the feeding mechanism of the card feeder into the accounting machine or other utilizing device with which it is associated. As may best be seen in FIG. 4, during the time that the topmost card 33 is separated from the cylinder 134 by more than approximately one eighth of an inch, radiation from the illuminating tubes 171 is reflected by the topmost card 33, so that it impinges on the photocell 174, which is situated in the rear portion of the tube 173. Due to the location of the photocell 174 in said tube, the radiation which impinges upon it must be quite directional, and stray, or outside, radiation, such as sunlight, will not impinge upon the photocell 174 and therefore will not affect operation of the machine. It is possible that sunlight striking the side of the cylinder 134 adjacent the photocell 174 might be reflected to impinge upon said photocell, and the shield 172 has been provided to eliminate this possibility.

Referring now to FIG. 5, while the photocell 174 is illuminated, it will remain in a relatively low-resistance state, so that the —48-volt D.C. supply applied to the terminal 186 provides a negative bias on the No. 1 control electrode of the thyratron 180 and prevents said thyratron from conducting. Accordingly, the energizing circuit for the relay K109 is not completed, and said relay remains deenergized. The contacts K109B1 (FIG. 6), controlled by the relay K109, accordingly remain in closed condition, and the table feed solenoid L104 is maintained in energized condition.

When the solenoid L104 is energized, its actuator is shifted downwardly, to the position shown in FIG. 2, to rock the shaft 105 clockwise, against the force of the spring 110, to position the arm 104 so that the shoulder 102 of the slot 103 in said arm is aligned with the stop 100 on the pitman 97, as shown in FIG. 1. In this position of the arm 104, the table 60 is driven upwardly in the manner previously described.

Now, when the topmost card 33 moves to within approximately one eighth of an inch of the periphery of the cylinder 134, the radiation which was previously reflected from the tubes 171 to the photocell 174 is substantially blocked, so that said photocell is no longer illuminated to an appreciable degree. This is effective to increase greatly the resistance of the photocell 174 and removes the negative bias of the No. 1 control electrode of the thyratron 180. With this negative bias removed, the thyratron 180 fires, and the conduction through said thyratron completes the energizing circuit for the relay K109. Energization of this relay opens the contacts K109B1 in the circuit of FIG. 6 and causes the table feed solenoid L104 to deenergize.

Deenergization of the solenoid L104 permits the spring 110 (FIG. 2) to rock the arm 109, and the shaft 105 and the arm 104 secured thereto, counter-clockwise, to position the shoulder 101 in alignment with the stop 100 on the pitman 97.

It will be seen in FIG. 1 that, when the shoulder 102 is positioned opposite the stop 100, said stop has freedom to move, together with the pitman 97, the full extent of movement permitted by the cam 95, under the influence of the spring 98. However, when the shoulder 101 is brought into the path of movement of the stop 100, the extent of movement to the left, as as seen in FIG. 1, of the pitman 97 under the influence of the spring 98 is limited by the engagement of the end of the stop 100 with the shoulder 101 on the arm 104. The pitman 97 is thus unable to rock the ratchet plate 76, and the feed pawl 77 on said plate can therefore not engage the next tooth of the ratchet wheel 75 to advance said wheel another step. The upward movement of the table 60 with the stack of cards thereon is thus terminated until such time as sufficient cards 33 have been taken from the top of the stack by the feeding mechanism of the card feeder to permit the radiation from the tubes 171 to be reflected from the topmost card 33 into the tube 173 to impinge upon the photocell 174. This reduces its resistance, which reapplies the negative bias on the No. 1 control electrode of the thyratron 180 to cut off said thyratron, deenergizing the relay K109, to cause the solenoid L104 to energize, to shift the arm 104 so that the shoulder 102 of the slot 103 is again positioned opposite the stop 100 on the pitman 97. The pitman 97 is then free to operate to the full extent of its movement once more, and will rock the ratchet plate 76 sufficiently to cause the feed pawl 77 to feed the ratchet wheel 75 another step and thus raise the table 60.

When it is desired to lower the table 60, as, for example, to place a new stack of cards 33 thereon, the pawls 77 and 79 must be disengaged from the ratchet wheel 75. As has been previously described, this may be accomplished by depression of the key tip 113. The table 60 is then free to move downward under the influence of gravity or manual pressure thereon to the desired extent, after which the pressure on the key tip 113 may be released to retain the table 60 in the selected position, and to permit further upward movement thereof.

While the form of mechanism shown and described herein is admirably adapted to fulfill the objects primarily stated, it is to be understood that it is not intended to confine the invention to the one form or embodiment disclosed herein, for it is susceptible of embodiment in various other forms, within the scope of the appended claims.

What is claimed is:

1. In a record member feeding device for use in conjunction with a utilizing device, the combination comprising a record member supporting table for supporting a stack of record members; record member advancing means, including a rotatable drive wheel and suction means therein and effective through apertures in said wheel to apply suction to cause the topmost record member of the stack to adhere to said wheel for advancing the topmost record member from the table to a position from which it may be fed into the utilizing device; rack and pinion means for elevating said supporting table to maintain the topmost record member of the stack in a position in which it may be caused to adhere to the rotatable drive wheel by the suction applied through the apertures in said wheel; ratchet means for driving the rack and pinion gear means; cyclically operable means for driving the ratchet means; blocking means operable to block effective movement of the cyclically operable means to prevent driving of the ratchet means and thus prevent elevation of said supporting table; shifting means operable to shift the blocking means between a first blocking position in which it is capable of blocking effective movement of the cyclically operable means and a second non-blocking position in which it is incapable of blocking effective movement of the cyclically operable means; switching means for controlling the shifting means; conduction control means for operating the switching means; light-sensitive means operable to control the conduction control means, and positioned on one side of the record member advancing means; and a light source positioned on a side opposite said one side of the record member advancing means, whereby light from the light source is reflected by the topmost record member of the stack to the light-sensitive means to cause said light-sensitive means to exercise a control over the shifting means to render said blocking means ineffective to prevent elevating movement of the table so long as the topmost record member is spaced from the record member advancing means more than a given distance, and whereby when the topmost record member is moved closer than said given distance to the record member advancing means by movement of said table, the reflection of the light from said light source to the light-sensitive means is reduced sufficiently by the intervening record member advancing means that said light-sensitive means exercises control over the shifting means to cause said blocking means to be shifted to halt the elevating movement of said table, the light-sensitive means permitting sensing of the position of the topmost record member of the stack without applying a load to said topmost record member which would prevent the suction applied thereto from being effective.

2. In a record member feeding device for use in conjunction with a utilizing device, the combination comprising a record member supporting table for supporting a stack of record members; record member advancing means for advancing the topmost record member from the table to a position from which it may be fed into the utilizing device; rack and pinion means for elevating said supporting table to maintain the topmost record member of the stack in operative association with the record member advancing means; ratchet means for driving the rack and pinion gear means; cyclically operable means for driving the ratchet means; blocking means operable to block effective movement of the cyclically operable means to prevent driving of the ratchet means and thus prevent elevating of said supporting table; shifting means operable to shift the blocking means between a first blocking position in which it is capable of blocking effective movement of the cyclically operable means and a second, non-blocking position in which it is incapable of blocking effective movement of the cyclically operable means; light-sensitive means operable to control the shifting means and positioned on one side of the record member advancing means; and a light source positioned on a side opposite said one side of the record member advancing means whereby light from the light source is reflected by the topmost record member of the stack to the light-sensitive means to cause said light-sensitive means to exercise a control over the shifting means to render said blocking means ineffective to prevent elevating movement of the table so long as the topmost record member is spaced from the record member advancing means more than a given distance, and whereby when the topmost record member is moved closer than said given distance to the record member advancing means by movement of said table, the reflection of the light from said light source to the light-sensitive means is reduced sufficiently by the intervening record member advancing means that said light-sensitive means exercises control over the shifting means to cause said blocking means to be shifted to halt the elevating movement of said table.

3. In a record member feeding device for use in conjunction with a utilizing device, the combination comprising a record member supporting table for supporting a stack of record members; record member advancing means for advancing the topmost record member from the table to a position from which it may be fed into the utilizing device; means for elevating said supporting table to maintain the topmost record member of the stack in operative association with the record member advancing means; means for driving the elevating means; blocking means operable to prevent elevating movement of said supporting table; shifting means operable to shift the blocking means between a first blocking position in which it is capable of preventing elevating movement of said table and a second, non-blocking position in which it is incapable of preventing elevating movement of said table; switching means for controlling the shifting means; conduction control means for operating the switching means; radiation-sensitive means operable to control the conduction control means, and positioned on one side of the record member advancing means; and a radiation source positioned on a side opposite said one side of the record member advancing means, whereby radiation from the radiation source is reflected by the topmost record member of the stack to the radiation-sensitive means to cause said radiation-sensitive means to exercise a control over the shifting means to render said blocking means ineffective to prevent elevating movement of the table so long as the topmost record member is spaced from the record member advancing means more than a given distance and whereby when the topmost record member is moved closer than said given distance to the record member advancing means by movement of said table, the reflection of the radiation from said radiation source to the radiation-sensitive means is reduced sufficiently by the intervening record member advancing means that said radiation-sensitive means exercises control over the shifting means to cause said blocking means to be shifted to halt the elevating movement of said table.

4. In a record member feeding device for use in conjunction with a utilizing device, the combination comprising a record member supporting table for supporting a stack of record members; record member advancing means for advancing the topmost record member from the table to a position from which it may be fed into the utilizing device; means for elevating said supporting table to maintain the topmost record member of the stack in operative association with the record member advancing means; means for driving the elevating means; blocking means operable to prevent elevating movement of said supporting table; shifting means operable to shift the blocking means between a first blocking position in which it is capable of preventing elevating movement of said table and a second, non-blocking position in which it is incapable of preventing elevating movement of said table; radiation-sensitive means operable to control the shifting means and positioned on one side of the record member advancing means; and a radiation source positioned on a side opposite said one side of the record member advancing means, whereby radiation from the radiation source is reflected by the topmost record member of the stack to the radiation-sensitive means to cause said radiation-sensitive means to exercise a control over the shifting means to render said blocking means ineffective to prevent elevating movement of the table so long as the topmost record member is spaced from the record member advancing means more than a given distance, and whereby when the topmost record member is moved closer than said given distance to the record member advancing means by movement of said table, the reflection of the radiation from said radiation source to the radiation-sensitive means is reduced sufficiently by the intervening record member advancing means that said radiation-sensitive means exercises control over the shifting means to cause said blocking means to be shifted to halt the elevating movement of said table.

5. In a record member feeding device for use in conjunction with a utilizing device, the combination comprising a record member supporting table for supporting a stack of record members; means for driving said table and the stack of record members supported thereby; disabling means for selectively preventing driving of said table; an element arranged to cooperate with the exposed record member of said stack; a source of radiation positioned on one side of said element; and radiation-sensitive means positioned on a side opposite said one side of said element and operable in response to radiation from said source reflected past the element by the exposed record member of said stack to control said disabling means to determine the position of said table, said radiation-sensitive means causing said disabling means to prevent further driving of said table when the exposed record member is driven to a given minimum distance from said element so that radiation from said source to said radiation-sensitive means is substantially blocked by said element.

6. In a record member feeding device for use in conjunction with a utilizing device, the combination comprising a record member supporting table for supporting a stack of record members; a radiation-opaque element; means for driving said table and the stack of record members supported thereby toward a position adjacent to the radiation-opaque element; disabling means for selectively preventing driving of said table; and radiation-sensitive means positioned to one side of said radiation-opaque element and operable in response to radiation reflected from a surface of that record member of said stack which is closest to the radiation-opaque element, past said radiation-opaque element, to control said disabling means to prevent further driving of said table when said closest record member is moved sufficiently close to the radiation-opaque element that said element substantially blocks the reflected radiation from impinging on the radiation-sensitive means.

References Cited in the file of this patent
UNITED STATES PATENTS

| | | |
|---|---|---|
| 2,071,115 | Fleischer | Feb. 16, 1937 |
| 2,109,505 | Fue et al. | Mar. 1, 1938 |
| 2,402,453 | Schneider | June 18, 1946 |
| 2,584,730 | Novick | Feb. 6, 1952 |
| 2,707,142 | Waite | Apr. 26, 1955 |